Oct. 15, 1968

C. J. WHITFIELD ET AL  3,405,541

SHEAR PIN COUPLING

Filed June 22, 1966

INVENTORS
Carroll J. Whitfield
Verle M. Tharpe

Newton, Hopkins,
Jones & Ormsby

ATTORNEYS

United States Patent Office 3,405,541
Patented Oct. 15, 1968

3,405,541
SHEAR PIN COUPLING
Carroll J. Whitfield, Albany, Ga., and Verle M. Tharpe, Auburn, Ind., assignors to Lilliston Implement Company, Albany, Ga., a corporation of Georgia
Filed June 22, 1966, Ser. No. 559,444
3 Claims. (Cl. 64—28)

ABSTRACT OF THE DISCLOSURE

A shear pin coupling for limiting the torque transmitted between two rotatable elements comprising a first shaft connectable to the driving member and including a radially outwardly extending flange, a second shaft extending in coaxial relationship with the first shaft and including a radially outwardly extending flange in juxtaposition with the other flange, and a shroud connected to one of the flanges and extending axially beyond the other flange. The shroud defines an inwardly facing annular groove, and an expandable retaining ring is positioned in the groove to retain the other flange within the confines of the shroud. Each flange defines alignable apertures, and shear pins are insertable through the apertures.

---

In the past, it has been found desirable to construct farm equipment, such as mowing machines, with portions that will fail when a predetermined force is exerted on certain parts thereof. In the example of a mowing machine, the cutting blade is rotated at a high angular velocity so that the crop is cut with a "clean cut" from the ground and the mowing machine can be pulled over the ground at a fairly high speed. If the blade of the mowing machine hits an obstruction, such as a stump, clod of dirt, roots, etc., the blade will be abruptly slowed or stopped. Of course, this exerts a tremendous force on the blade driving elements and the weakest portion of the drive train is likely to fail. Accordingly, it has become desirable to construct the blade or its driving elements with a weakened link that is fairly inexpensive and easy to replace so that if the drive train fails due to an obstruction encountered by the blade, the failure will be localized in the predetermined weakened link of the drive train. Spare weak links can be kept at hand so that easy and expedient repair can be attained in the field without costly delays. However, the elements of the previous constructions usually separate when the weak link is broken, which causes the operator to have to reassemble the elements when replacing the weak link.

Accordingly, this invention comprises a shear limiter of the type utilized with a mowing machine, the shear limiter having a power input shaft of a size and configuration substantially equal to that of the mower drive shaft, the shear limiter power input shaft terminating in an outwardly extending, apertured flange, a female coupling element having a splined socket sized and constructed to receive the mower drive shaft, the socket having a flange in juxtaposition with the flange of the shear limiter drive shaft, the flange of the socket having an extension surrounding the flange of the drive shaft, a retaining ring connecting the extension of the socket flange to the flange of the drive shaft in a manner that permits rotational movement between the two flanges but prevents axial movement therebetween, and at least one shear pin connecting the two flanges together to prevent rotational movement therebetween.

Thus, it is an object of this invention to provide apparatus for limiting the torque exerted between the driving and driven elements of a power train.

Another object of this invention is to provide apparatus for limiting the torque exerted between the driving and driven elements of a power train wherein when a predetermined torque is exceeded the driving and driven elements will rotate with respect to each other but will not otherwise come apart.

Another object of this invention is to provide a shear limiter in a power train wherein shear pins of predetermined strength connect the elements of the shear limiter together, the shear limiter being constructed in a manner so that it will remain assembled if the shear pins fail.

Another object of this invention is to provide a shear limiter for limiting the amount of torque transmitted from the cutting blade of a mower to the source of power.

Another object of this invention is to provide a shear limiter that is easily repaired in the field without undue delay to the operation of the power train, the shear limiter being constructed to fit between the various existing elements of the power train, and being well designed to meet the economics of manufacture.

Other objects, features and advantages of the present invention will become apparent upon reading the following specifications, taken in conjunction with the accompanying drawings, in which.

Figure 1:
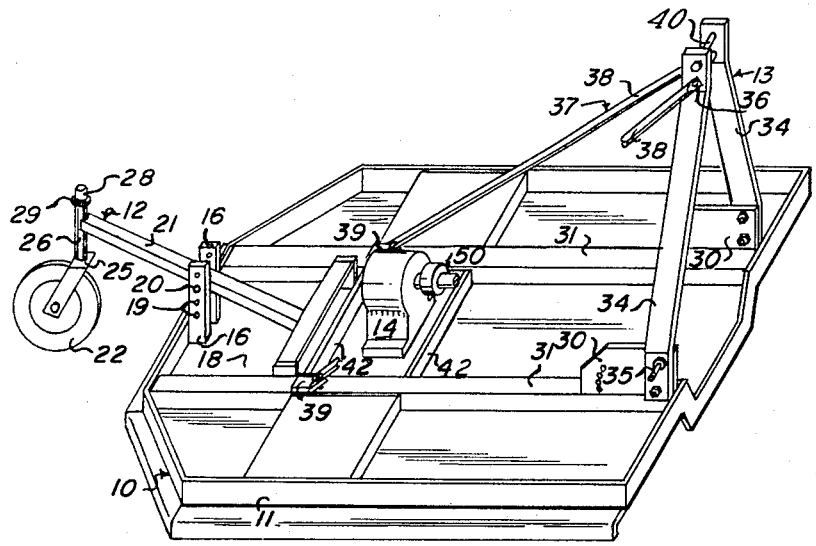
FIG. 1 is a perspective view of a mowing machine, showing the shear limiter positioned thereon.

Referring now more particularly to the drawing, in which like numerals indicate like parts throughout the several views, FIGURE 1 shows a mower 10 having a frame 11, a caster wheel assembly 12, a hitch assembly 13, a gear box 14, and a mower blade (not shown). The frame 11 is supported by the caster wheel assembly 12 at one end and by the hitch assembly 13 at the other end, when the mower is connected to a tractor, or the like.

The castor wheel assembly 12 includes a pair of upright apertured stanchions 16 attached to the upper surface 18 of the frame 11. The stanchions 16 define a series of apertures 19 through which a pin 20 can be inserted. A leveling arm 21 is pivotally attached to the upper surface 18 of the frame, near the center of the frame, and extends rearwardly of the mower pin. The leveling arm 21 is apertured (not shown) midway along its length and the pin 20 is slidably received therein. The caster wheel 22 is connected to the leveling arm 21 by means of the forked wheel support 25 and the sleeve 26. The forked wheel support has an axle 28 extending upwardly therefrom that is rotatably and slidably received within the sleeve 26. The axle 28 is disposed at an angle with the forked wheel support 25 so that the center of rotation of the wheel is rearwardly offset from the axis of the sleeve 26 in the usual manner of caster wheel construction. The axle 28 is retained in the sleeve 26 by a locking ring 29. With this arrangement the wheel 22 will freely rotate within the sleeve 26 of the caster wheel assembly 12 to follow the direction of movement of the mower 10. The distance the frame 11 is maintained from the surface of the ground is determined by the position of the leveling arm 21 between the stanchions 16. The leveling arm 21 can be adjusted in its disposition by removing the pin 20 and positioning the leveling arm between different apertures 19 of the stanchions 16 and reinserting the pin 20.

The hitch assembly 13 at the forward portion of the mower 10 comprises a pair of upwardly extending plates 30 attached to the upper surface 18 of the frame 11, adjacent strengthening ribs 31 of the frame 11. A pair of A frame arms 34 slope upwardly from the upwardly extending plates 30, toward each other. The A frame arms 34 are connected to the upwardly extending plates 30 by means of lift pins 35 inserted through mating holes in the upwardly extending plates 30 and the A frame arms. The A frame arms are connected to each other at their upper ends, and are joined to the A frame brace 37 by pin 36. The arms 38 of the A frame brace 37 are connected to the upper surface of the mower frame 11 by means of the angled tabs 39. The A frame arms 34 of the hitch assembly 13 extend upwardly beyond the pin 36 and are apertured to house a second pin 40. With this arrangement the mower pin can be connected to the tractor by removing the pin 40 from the A frame arms and inserting the tractor pulling attachment between the arms and reinserting the pin through the arms and the tractor pulling assembly. The distance the mower frame 11 will be positioned above the ground at its forward end will be determined by the elevation of the tractor pulling assembly.

Figure 2:
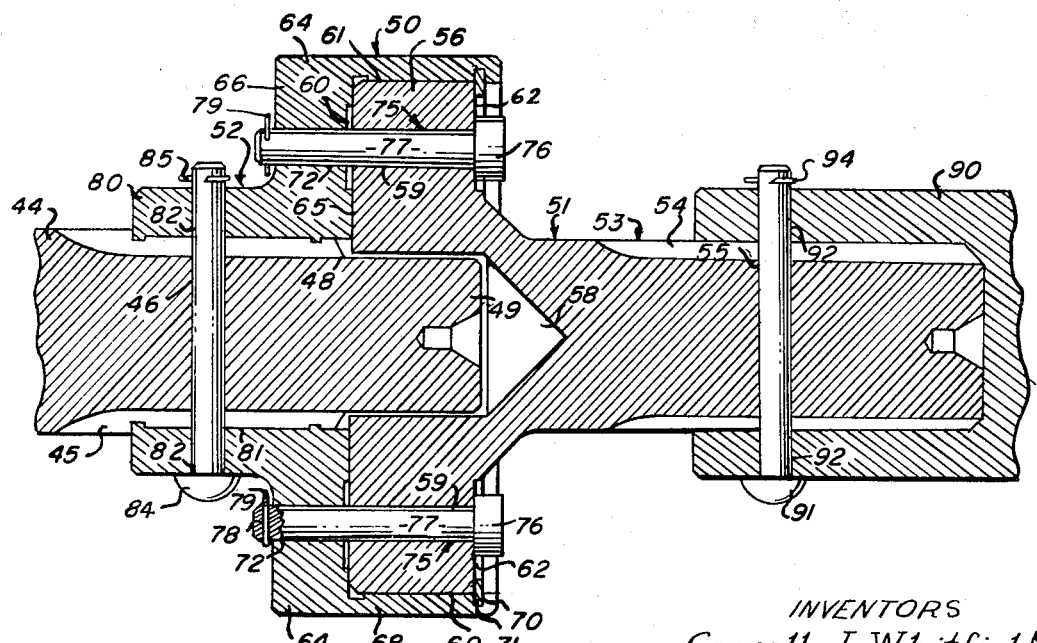
FIG. 2 is an elevational view, in cross-section, of the shear limiter.

The gear box 14 is positioned centrally of the frame 11 on its upper surface 18. A pair of supporting ribs 42 extend laterally between the strengthening ribs 31 of the frame 11 and the gear box 14 is the position between these ribs. The mower blade (not shown) is attached to the gear box 14 through the frame 11 by a shaft (not shown) extending into the gear box 14. A gear box input shaft 44 (FIG. 2) projects outwardly of the gear box, toward the forward portion of the mower 10. The gear box input shaft 44 is of standard size and configuration so as to readily be received in the standard drive assembly of a conventional tractor and comprising a series of splines 45 disposed therearound and a through bore 46 extending therethrough. The splines 45 terminate at 48 to form a projection 49 at the end of the shaft 44.

Shear limiter 50 comprises a driving member 51 and a driven member 52. The driving member 51 of the shear limiter comprises an input shaft 53 having splines 54 disposed therearound and a through bore 55 extending therethrough. The input shaft 53 is constructed of similar size and shape as the input shaft 44 of the gear box 14.

The input shaft 53 of the driving member 51 has an outwardly projecting flange 56 extending therefrom which defines a blind bore 58 centrally thereof. The outwardly extending flange 56 defines a pair of apertures 59 which are offset from, but parallel to, the input shaft 53. The outwardly extending flange or plate 56 has an inner surface 60, an outer periphery 61, and an outer surface 62.

The driven member 52 comprises a flange or plate 64 having an inner surface 65 and an outer surface 66. The flange or plate 64 further comprises an annular extension or shroud 68 having an inner periphery 69 of a diameter slightly larger than the diameter of the outer periphery 61 of the flange 56 of the driving member 51. The annular extension 68 extends axially of the driven member 52 a distance greater than the thickness of the outwardly extending flange 56 of the driving member 51. The annular extension 68 defines an annular groove 70 extending around its inner periphery 69 at a distance displaced from the flange or plate 64 that is slightly larger than the thickness of the outwardly extending flange 56 of the driving member 51. An expansible locking ring 71 is constructed to be positioned in the annular grooves 70 of the annular extension 68. The expansible locking rings 71 is of conventional design, being contracted slightly to slide over the inner periphery 69 of the annular extension 68 until it reaches the annular groove 70, whereupon it is expanded to fit within the annular groove 70.

With this construction, the outwardly extending flange 56 of the driving member 51 can be inserted within the annular extension 68 of the flange or plate 64 of the driven member 52, so that the inner surface 60 of the flange 56 and the inner surface 65 of the flange 64 are juxtaposed, and the retaining ring 71 can be replaced in its annular groove 70. Of course, the retaining ring 71 is of a thickness so that it projects inwardly of the inner periphery 69 of the annular extension 68 to abut the outer surface 62 of the flange 56 of the driving member 51 to prevent the removal of the driving member 51 from the driven member 52.

The flange or plate 64 of the driven member 52 defines a pair of apertures 72 disposed radially opposite from each other, and a distance apart so that they can be in alignment with apertures 59 of the flange 56 of the driving member 51, when the driving member and the driven member are properly aligned. When the driving member and driven member are in proper alignment so that their apertures 59 and 72, respectively, are properly aligned, shear pins 75 can be inserted therethrough.

Shear pins 75 comprise a head portion 76 and a body portion 77. The body portion 77 of the shear pins is sufficiently long to project through the driving and driven members, and to extend outwardly of the outer surface 66 of the flange or plate 64 of the driven member 52. The body portion 77 of the shear pins 75 are apertured at 78, at their ends remote from the head portion 76. Cotter pins 79 are insertable through the apertures 78.

The shear pins 75 are constructed of predetermined strength so that when a certain torque transmitted between the driving and driven members is exceeded they will shear. For instance, when the shear limiter is used in combination with the mower having a five foot mower blade a shear pin will be used that requires from 45,000 to 55,000 pounds per square inch shearing force to shear, while a seven foot mower blade will have shear pins requiring from 70,000 to 80,000 pounds per square inch shearing force to shear. This variance in strength qualities of the shear pins is required since the longer mower blades have a longer lever arm so that a force at the end of its longer lever arm would exert more torque on the drive train of the mower. Thus, a stronger shear pin would be required to withstand this torque for the longer blade, yet the blade damage and destruction would be substantially the same as when a weaker shear pin were utilized with a shorter mower blade.

*Assembly and operation*

The driving member 51 and the driven member 52 of the shear limiter are assembled by inserting the outwardly extending flange 56 of the driving member into the annular extension 68 of the flange 64 of the driven member until the flange 56 of the driving member clears the annular groove 70 of the annular extension 68. The retaining ring 71 is contracted, slid along the inner periphery 69 of the annular extension 68 until it comes into the vicinity of the annular groove 70, whereupon it is allowed to expand and seat in the annular groove 70. The driving and driven members 51 and 52 respectively, are then rotated with respect to each other until their apertures 59 and 72 are aligned with each other, whereupon shear pins 75 are inserted therethrough. Shear pins 75 are retained in the aligned apertures by means of cotter pins 79.

The flange or plate 64 of the driven member 52 has a socket 80 disposed centrally thereof and extending from the outer surface 66 in a direction opposite to the direction that the annular extension 68 extends from the flange 64. The socket 80 is disposed inwardly of the annular extension 68 and has a series of internal splines (not shown) disposed around its inner surface 81 which are sized and dimensioned to receive the spline 45 of the input shaft 44 of the gear box 14. The socket 80 has a pair of through bores located diametrically opposite from each other and in alignment with each other. The through bores 82 are of a size equal to the through bore 46 of the gear box input shaft 44, and when the input shaft 44 is inserted into the socket 80 and the through bore 46 aligned with the bores 82 of the socket 80, a retaining pin 84 can be inserted through the aligned bores and retained therein by a cotter pin 85.

When the shear limiter is assembled in this manner, the socket 80 of the driven member 52 can be slipped over the gear box input shaft 44, the splines of the socket 80 mating with the splines 45 of the input shaft 44, until the projection 49 of the input shaft 44 bottoms in the blind bore 58 of the driving member 51. When the socket 80 is inserted over the input shaft 44, care must be taken to insure that the apertures 82 of the socket 80 will be in alignment with the through bore 56 of the input shaft 44 when the shaft 44 bottoms in the blind bore 58. When the apertures 82 are in alignment with the through bore 56 the retaining pin 84 can be inserted through the aligned spaces and cotter pin 85 can be inserted through the end of the retaining pin 84, in the usual manner, to insure that the retaining pin 84 is not inadvertently removed.

When the shear limiter is positioned on the input shaft 44 of the gear box 14 in this manner, its input shaft 52 will extend away from the gear box 14 in a manner similar to the manner the gear box input shaft 44 extends from the gear box. Since the input shaft 52 of the shear limiter is of a configuration substantially similar to the input shaft 44 of the gear box, the tractor power takeoff unit 90 can be connected to the input shaft 52 of the shear limiter by inserting the retaining pins 91 through the apertures 92 of the tractor power takeoff unit and through the aperture 55 of the input shaft 53 of the shear limiter 50, and retained therein by the cotter pin 94. Thus, it can be seen that the inclusion of the shear limiter in the power train from the tractor power takeoff unit 90 toward the gear box 14 requires no unusual coupling elements or adapters, but is merely a device that can be inserted between these usual elements of a tractor and mower assembly without special coupling elements.

When the mower is operated by the tractor power takeoff unit 90, the shear limiter will be rotated and will cause the gear box input shaft 44 to rotate in its usual manner. If the mower blade (not shown) of the mower 10 encounters an obstruction that causes the mower blade to slow or stop, a force will be transmitted through the gear box and gear box input shaft 44 that will cause the driving and driven members 51 and 52, respectively, of the shear limiter to tend to rotate with respect to each other. If the obstruction encountered by the mower blade is sufficient to exert a torque of a magnitude capable of shearing the shear pins 75, the shear pins will shear and allow the driving and driven members 51 and 52, respectively, of the shear limiter to rotate with respect to each other. Of course, the retaining ring 71 located in the annular extension 68 of the driven member 52 will retain the driving member 51 within the annular extension 68 so that these members will not separate from each other. With this construction, the operator merely removes the broken shear pins 75 from the shear limiter, aligns the apertures 59 of the driving member with the apertures 72 of the driven member, and then inserts new shear pins 75 through the aligned apertures.

Because of the simplicity of this construction and arrangement, only a very small amount of time is required to replace the shear pins of the shear limiter. Furthermore, the shear pins are cheaply constructed and are small in size so that they are economical and convenient to stock and have at hand in the field when the mower is in operation. Accordingly, the shear limiter provides an economical and convenient method of preventing destruction of the mower blade and drive train; an arrangement that allows an unskilled operator of the mower to replace the shear pins of the shear limiter without undue breakdown and delay in time in the field.

It will be obvious to those skilled in the art that many variations may be made in the embodiments here chosen for the purpose of illustrating the present invention, without departing from the scope thereof as defined by the appended claims.

What is claimed as our invention is:

1. Apparatus for limiting torque transmitted between two rotatable elements comprising:
a first rotatable shaft member including means thereon for connection to one of the rotatable elements and radially outwardly extending flange means defining at least one aperture near its periphery,
a second rotatable shaft member in coaxial abutting relationship with said first shaft member and including means thereon for connection to the other of the rotatable elements and radially outwardly extending flange means defining at least one aperture near its periphery alignable with the aperture of said radially outwardly extending flange means of said first shaft member,
an axially extending annular flange connected to said radially outwardly extending flange means of said first shaft member and extending from its flange means a distance greater than the width of said radially outwardly extending flange means of said second shaft member, said axially extending annular flange defining an annular recess in its inner surface,
a flexible retaining ring positioned in said annular recess, said retaining ring being of a thickness sufficient to project inwardly of the periphery of the other of the flange means, and
a shear pin extending through the aligned apertures of the radially outwardly extending flange means of said first and second rotatable shaft members.

2. The invention of claim 1 wherein one of said shaft means includes an internally splined socket for connection to one of said rotatable elements and the other of said shaft means includes an externally splined portion for connection to one of said rotatable elements.

3. Apparatus for limiting the torque transmitted between two rotatable elements comprising:
a first shaft member rotatable about its longitudinal axis and including a radially outwardly extending flange member at one of its ends,
a second shaft member extending in coaxial relationship with said first shaft member and rotatable about its longitudinal axis and including a radially outwardly extending flange member at one of its ends in juxtaposition with the radially outwardly extending flange member of said first shaft member,
a shroud integrally connected to the radially outwardly extending flange member of said first shaft member and extending toward and beyond the radially outwardly extending flange member of said second shaft member,
an inwardly facing groove defined in said shroud at a position located beyond the radially outwardly extending flange member of said second shaft member,
an expandable retaining ring positioned in said groove and extending inwardly of said shroud a distance sufficient to confine the radially outwardly extending flange member of said second shaft member within said shroud, and
at least one shear pin connecting together the radially outwardly extending flange members of said first and second shaft members.

References Cited
UNITED STATES PATENTS

| | | | |
|---|---|---|---|
| 980,341 | 1/1911 | Roper | 64—28 |
| 1,637,944 | 8/1927 | Keller | 64—28 |
| 2,739,463 | 3/1956 | Pfister et al. | 64—28 |
| 2,787,467 | 4/1957 | Jacobsen | 64—28 X |
| 2,838,920 | 6/1958 | Hill et al. | 64—28 |
| 2,948,173 | 8/1960 | Herrmann | 64—29 X |
| 3,147,834 | 9/1964 | Helland | 64—29 X |

HALL C. COE, *Primary Examiner.*